(12) United States Patent
Morin

(10) Patent No.: US 6,543,144 B1
(45) Date of Patent: Apr. 8, 2003

(54) MULTIPURPOSE TOOL

(76) Inventor: Bruno Morin, 2625 St. Pierre, St. Ours, Quebec (CA), J0G 1P0

( * ) Notice: Subject to any disclaimer, the term of this patent is extended or adjusted under 35 U.S.C. 154(b) by 0 days.

(21) Appl. No.: 09/688,074

(22) Filed: Oct. 13, 2000

Related U.S. Application Data
(60) Provisional application No. 60/159,744, filed on Oct. 15, 1999.

(51) Int. Cl.[7] ............................... B43L 7/14; B43L 7/10
(52) U.S. Cl. ........................ 33/27.032; 33/451; 33/471; 33/473
(58) Field of Search .......................... 33/27.032, 27.02, 33/27.031, 343, 347, 348, 348.2, 354, 404, 415, 416, 417, 451, 452, 453, 464, 465, 471, 472, 473, 470

(56) References Cited

U.S. PATENT DOCUMENTS

| | | | | |
|---|---|---|---|---|
| 419,615 A | * | 1/1890 | Stilwell | 33/343 |
| 1,040,284 A | * | 10/1912 | Cunningham | 33/473 |
| 1,099,567 A | * | 6/1914 | Neukirchen | 33/27.02 |
| 1,099,597 A | * | 6/1914 | Green | 33/473 |
| 1,134,826 A | * | 4/1915 | Eckre | 33/451 |
| 1,539,912 A | * | 6/1925 | Peterson | 33/27.03 |
| 1,585,563 A | * | 5/1926 | Schlattau | 33/471 |
| 1,636,623 A | * | 7/1927 | Cash | 33/473 |
| 1,725,263 A | * | 8/1929 | Fleischman | 33/473 |
| 2,505,437 A | * | 4/1950 | Skolnick | 33/27.02 |
| 2,634,503 A | * | 4/1953 | Richardson | 33/343 |
| 3,499,225 A | * | 3/1970 | Darrah | 33/347 |
| 4,593,475 A | * | 6/1986 | Mayes | 33/347 |
| 4,761,890 A | * | 8/1988 | Morrell | 33/473 |
| 5,025,567 A | * | 6/1991 | McWilliams et al. | 33/348.2 |
| 5,359,782 A | * | 11/1994 | Langmaid | 33/415 |
| 5,446,969 A | * | 9/1995 | Terenzoni | 33/451 |

* cited by examiner

*Primary Examiner*—Christopher W. Fulton
(74) *Attorney, Agent, or Firm*—Eric Fincham

(57) ABSTRACT

A multipurpose tool for use by woodworkers or the like and which includes a body portion having end walls and first and second pairs of opposed side walls, with a plurality of level indicating means, at least one magnet recessed in the body portion, and a recess formed in one end of the body portion and extending between the first pair of opposed side walls, and a protractor arm having a longitudinally extending slot mounted in the recess.

15 Claims, 3 Drawing Sheets

MULTIPURPOSE TOOL

This application claims the benefit of Provisional Application No. 60/159,744, filed Oct. 15, 1999.

FIELD OF THE INVENTION

The present invention relates to a multipurpose tool and more particularly, relates to a multipurpose ironworker's tool.

BACKGROUND OF THE INVENTION

In construction, a variety of measuring and indicating devices are used to ensure the correct placement and attachment of the various structural components of a building such as the foundation, walls, floors, roofs, etc. Typically, it is important to ascertain if structures are level in a horizontal plane and plumb in a vertical line in relation to the horizontal plane. Also, a variety of angles, including non-square angles, must be accurately measured and marked. Multiple calculations are required from the data supplied by these tools so that structures are placed correctly within a given foundation and the required accurate placement of structural components. As such, a plurality of tools is usually employed which include various types of levels, which can include line levels, water levels, plumb bobs, framing squares, bevel gauges, compasses, etc.

Obviously, while these tools have received wide acceptance within the building trades, they do not address the time saving conveniences obtained with the tool of the present invention. The tool of the present invention combines many devices into a single tool and provides for extremely accurate and convenient marking of structural components and particularly, provides a tool useful in the ironworker's trade.

The present invention provides a tool which may be used as a level, both in the horizontal and vertical planes, and can also be used for marking various angles, and also incorporates a compass.

SUMMARY OF THE INVENTION

It is an object of the present invention to provide a multipurpose tool which combines many functions in one and which may be utilized in many different trades.

According to one aspect of the present invention, there is provided a multipurpose tool comprising an elongated body portion, the body portion having a first and second end walls, and first and second pairs of opposed side walls extending between the first and second end walls, at least one of the end walls and one of the side walls being mutually perpendicular to each other, a plurality of level indicating means recessed in the body portion, the level indicating means being designed to indicate a vertical level, a horizontal level and a 45° angle thereto, at least one magnet recessed in the body portion, and a recess formed in one end of the body portion, the recess extending between the first pair of opposed side walls, a protractor arm having a longitudinally extending slot therein mounted in the recess.

In greater detail, the multipurpose tool of the present invention is designed to combine the features of a number of different individual tools. In particular, in a preferred embodiment, the multipurpose tool can function as a bevel square, a combination square, a marking gauge, a torpedo level, a ruler, a compass, etc. It may find use both for the average handyman and also for commercial and industrial use. Thus, it can be used by woodworkers, metal workers, millwrights, etc.

As aforementioned, the multipurpose tool has a main body portion which may be formed of any suitable material such as a wood or plastic material. In a preferred embodiment, the body portion is formed of a molded plastic material.

Preferably, although not essential, the body portion has a generally rectangular configuration with four sides and two ends. In this respect, in a preferred embodiment, not all of the side walls are necessarily planer—there are various recesses and notches formed therein for purposes which will become clear from the description of the preferred embodiment. It suffices to say that there should be at least one end wall and one side wall each lying in a single plane such that the various level indicating devices may be used.

As aforementioned, there are various level indicating devices and preferably, these are of the bubble tube variety wherein the bubble of a gas must be aligned between two lines to indicate a horizontal, perpendicular or 45° angle. In one embodiment, there may be provided lighting means associated with each of the level indicating devices—these would be small lights adjacent thereto having a battery powered light which may be activated by touch.

The device includes a protractor arm which is retractable within the body of the multipurpose tool and which is preferably rotatable through 270°. In order to precisely align the protractor arm at 270° from its recessed position, there is preferably provided a stop member. Also, in order to retain the protractor arm in any desired position, there may be provided locking means for doing so. Also, the protractor arm is preferably slidable within its mount such that its length may be adjusted.

As will be seen from the description of the preferred embodiments, there are provided various notches and recesses which provide convenient places to hold the marking tools during the use of the device.

BRIEF DESCRIPTION OF THE DRAWINGS

Having thus generally described the invention, reference will be made to the accompanying drawings, in which.

DESCRIPTION OF THE PREFERRED EMBODIMENTS

Figure 1:
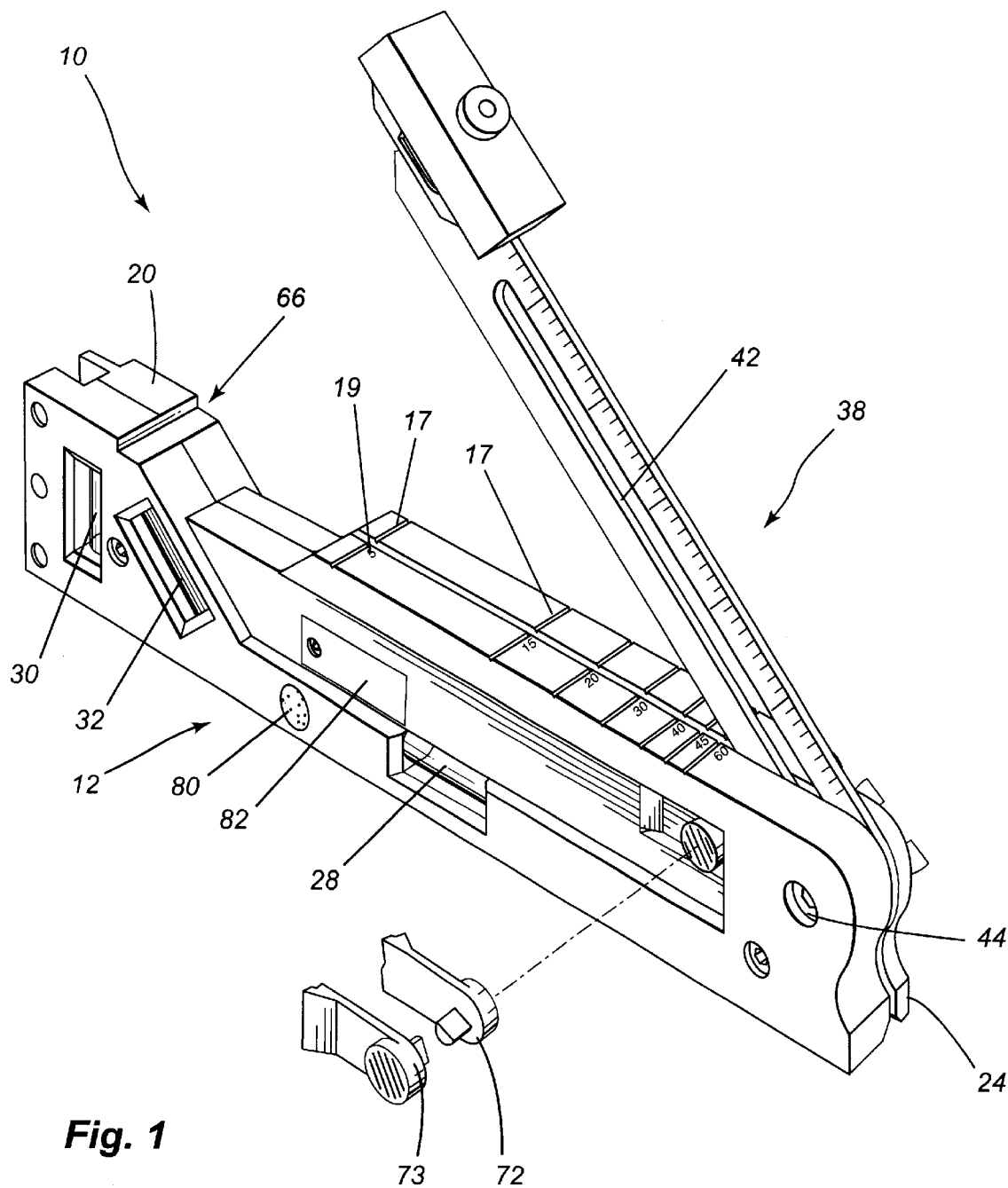
FIG. 1 is a perspective view of one embodiment of a multipurpose tool according to the present invention.
Figure 3:
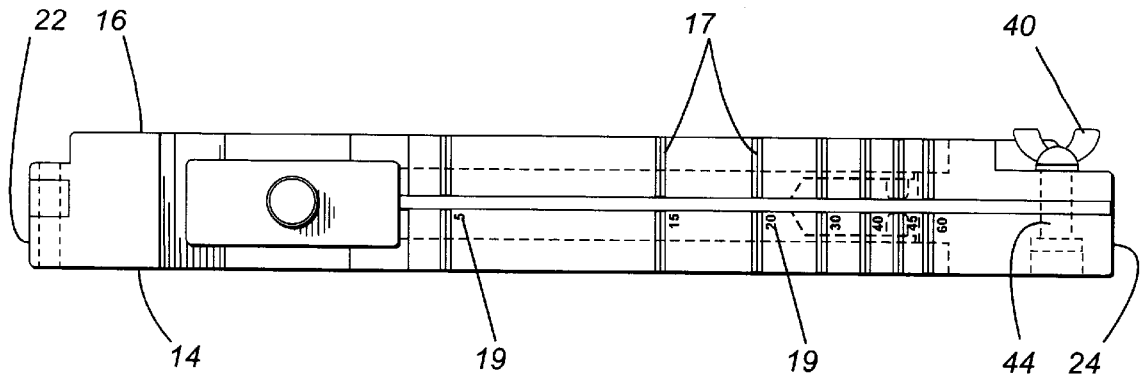
FIG. 3 is a top plan view thereof.

Referring to the drawings in greater detail and by reference characters thereto, there is illustrated a multipurpose tool which is generally designated by reference numeral 10.

Multipurpose tool 10 includes a body portion 12 which, in general terms, has a first pair of opposed side walls 14 and 16, and 1 bottom wall 18 and a top wall 20. First and second end walls 22 and 24 respectively are substantially perpendicular to walls 14, 16, 18 and 20 such that the overall configuration is rectangular.

Provided on bottom wall 18 are a plurality of indicia 26 for purposes of measurement such as is commonly used by linear measuring devices.

Multipurpose tool 10 also includes a plurality of bubble tube level members and to this end, there is shown a horizontal bubble tube 28, a vertical bubble tube 30, and bubble tube 32 for a 45° angle. It will be understood that the terms horizontal and vertical are relative and depend on the orientation of the device.

In the illustrated embodiment, a pair of magnets 34 are provided recessed within bottom wall 18, magnets 34 being particularly useful when the device is employed on steel beams. Also, a groove 48 is formed in side wall 14 to enable mounting on a cylindrical member such as a pipe.

Figure 5:
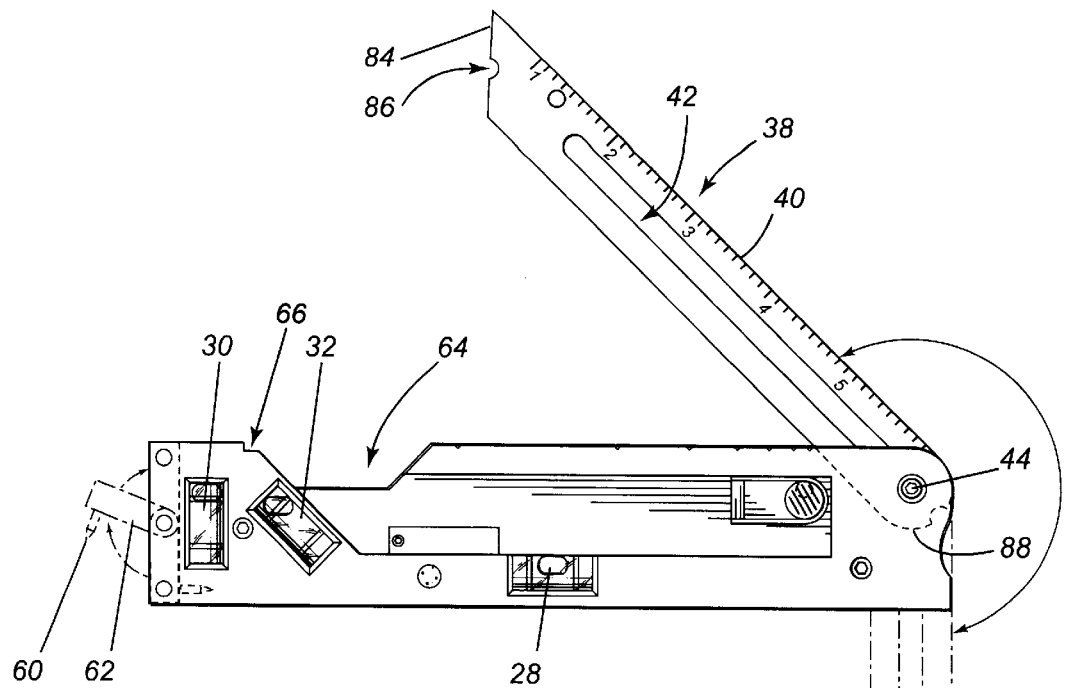
FIG. 5 is a side view illustrating operation of the protractor arm.

There is also provided a protractor arm which is generally designated by reference numeral 38 and which protractor arm carries indicia 40 thereon again for purposes of measurement. A longitudinally extending slot 42 is used for mounting protractor arm 38 and to this end, there is provided a mounting member 44 having a wing nut 46 such that protractor arm 38 can be tightened in any desired position. As shown in FIG. 5, protractor arm 38 may extend through 270°. It will also be noted that at its distal end, protractor arm 38 has a bevelled shape while at its proximal end, it has an arcuate configuration.

Figure 4:
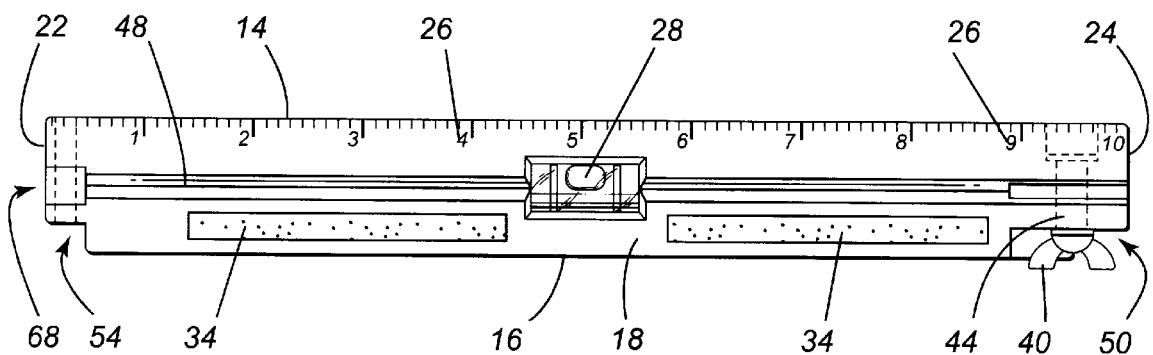
FIG. 4 is a bottom plan view thereof.

End wall 24, as may best be seen in FIG. 4, has at its outer periphery a recess or notch 50 formed therein. Similarly, end wall 22 has a recess 54 formed thereat. Recess 54 is useful as a heel portion when the multipurpose tool is placed on an H-beam as is commonly done by ironworkers before tracing a marking line.

Within top wall 20, there is provided a recess generally designated by reference numeral 64 to permit ready access to protractor arm 38. It will also be noted that the wall is formed such that there is a notch generally designated by reference numeral 66 which may be utilized as a place to receive the end of a tape of a tape measure device in order to measure the distance with respect to the opening of the protractor arm such that the same angle can be transferred.

In order to ensure the perpendicularity of protractor arm 38 with respect to bottom wall 18, there is provided a stop member 70. Similarly, there are provided removable stop members 72 and 73 placed such that protractor arm 38 is temporarily stopped at an angle of 45° and 30° respectively. It will also be seen that top wall 20 includes notches 17 with indicia 19 to indicate the angle that protractor arm 38 forms with respect to top wall 20.

In the preferred embodiment, and as shown in the drawings, there is provided a light 74 mounted adjacent horizontal bubble tube 28 such that easier visual access may be gained thereto. Similarly, there is provided a light 76 adjacent vertical bubble tube 30 and a light 78 adjacent 45° bubble tube 32. Lights 74, 76 and 78 are LED's which are operated by switch 80. A suitable battery is mounted within door 82.

Protractor arm 38 has, at its distal end, an angled end 84 and in which there is provided a notch 86. Notch 86 is designed to be used with a marking device such as a pencil such that it will not slip when marking an object. Protractor arm 38 also has a proximal end 88 which is of an arcuate configuration and has a notch 90 therein.

Figure 2:
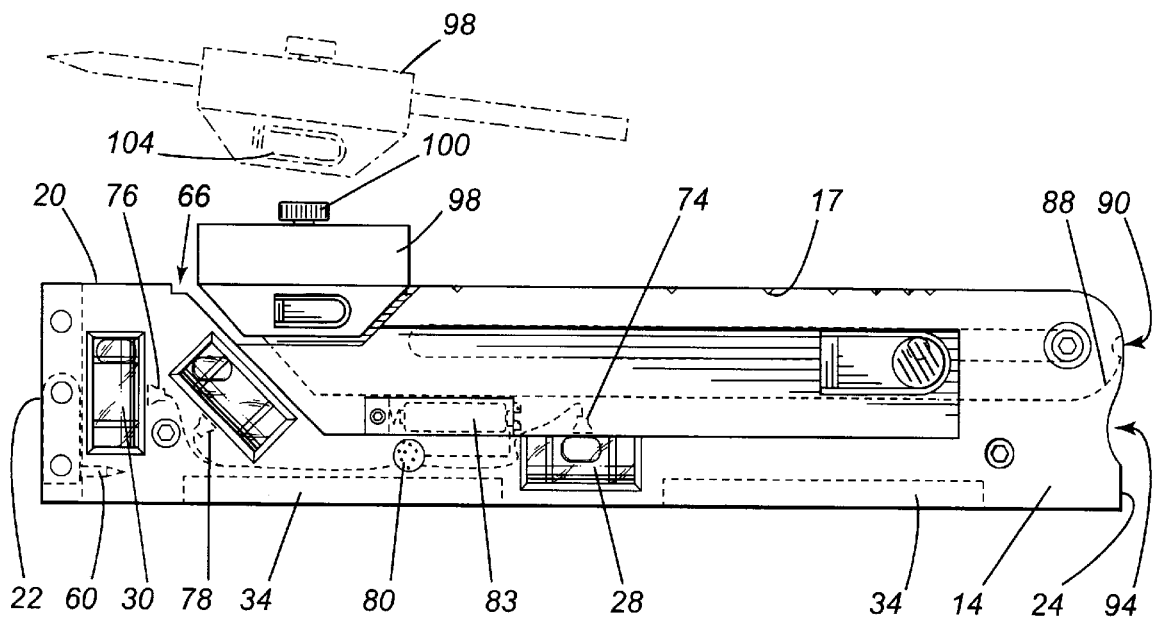
FIG. 2 is a side elevational view thereof.
Figure 6:
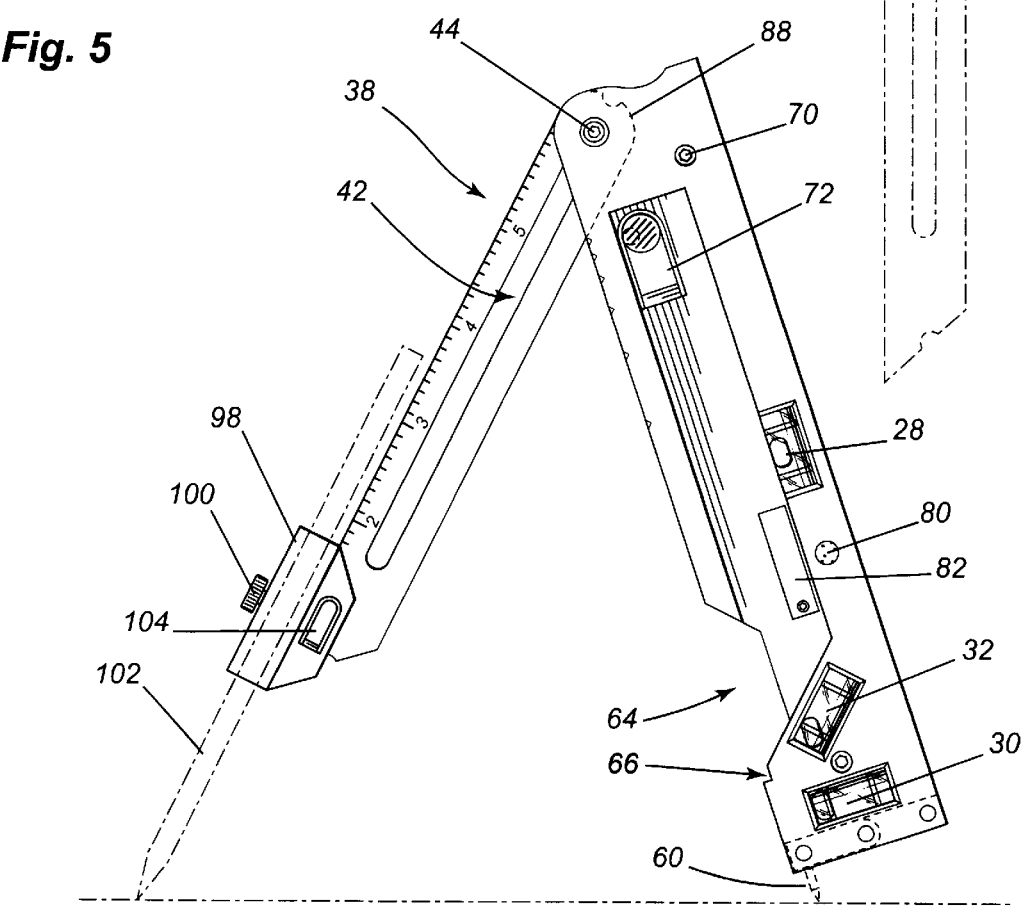
FIG. 6 is a side view illustrating use of the multipurpose tool as a compass.

As may be seen in FIGS. 2 and 6, end wall 24 also has an arcuate recess 94. This facilitates the holding of the device in use and is designed to receive a finger of the user.

A holding device generally designated by reference numeral 98 is designed to be attached to the distal end of protractor arm 38 by means of a retaining member 104. In turn, holding device 98 is designed to receive a marking device 102 by means of screw 100.

It will be understood that the above described embodiments are for purposes of illustration only and that changes or modifications may be made thereto without departing from the spirit and scope of the invention.

I claim:

1. A multipurpose tool comprising:

an elongated body portion, said body portion having a first and second end walls, a top wall, a bottom wall, and first and second pairs of opposed side walls extending between said first and second end walls;

at least one of said end walls and one of said side walls being mutually perpendicular to each other;

a plurality of level indicating means recessed in said body portion, said level indicating means being designed to indicate a vertical level, a horizontal level and a 45° angle thereto; and a recess formed in said body portion, said recess extending between said first pair of opposed side walls, said recess also extending between a portion of said top and bottom walls, a protractor arm having a longitudinally extending slot therein mounted in said recess, said protractor arm being rotatably movable between a completely stored position in said recess through an arc of 270°.

2. The multipurpose tool of claim 1 wherein each of said level indicating means comprises a bubble tube.

3. The multipurpose tool of claim 1 further including length indicating indicia formed along one of said side walls.

4. The multipurpose tool of claim 1 wherein said protractor arm includes means for receiving a holding device.

5. The multipurpose tool of claim 1 further including a holding device secured to a distal end of said protractor arm, said holding device being designed to receive a marking device.

6. The multipurpose tool of claim 1 wherein said distal end of said protractor arm has a notch formed therein.

7. The multipurpose tool of claim 6 wherein said proximal end of said protractor arm has a notch formed therein.

8. The multipurpose tool of claim 1 wherein said top wall has a notch formed therein to form an abutment surface for an end of a tape measure.

9. The multipurpose tool of claim 1 wherein at least one of said end walls has an arcuate recess formed therein.

10. The multipurpose tool of claim 1 further including a compass point secured to said elongated body portion at one end thereof, said compass point being retractable into one of said end walls.

11. The multipurpose tool of claim 10 further including a plurality of light means, one of said light means being associated with each of said level indicating means.

12. The multipurpose tool of claim 11 further including stop means for said protractor arm when said protractor arm extends through 270°.

13. The multipurpose tool of claim 1 further including stop means for said protractor arm 38 when said protractor arm extends through 30° and 45°.

14. The multipurpose tool of claim 1 further including a longitudinally extending groove formed in one of said walls to permit placement of said multipurpose tool on a pipe.

15. The multipurpose tool of claim 1 further including indicia on one of said side walls to show the angle said protractor arm 38 forms with said side wall.

\* \* \* \* \*